(12) United States Patent
Appleton

(10) Patent No.: US 9,665,119 B2
(45) Date of Patent: May 30, 2017

(54) CONTROL INTERFACE ASSEMBLY

(71) Applicant: Deere & Company, Moline, IL (US)

(72) Inventor: Andy B. Appleton, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 81 days.

(21) Appl. No.: 14/618,646

(22) Filed: Feb. 10, 2015

(65) Prior Publication Data
US 2016/0231768 A1    Aug. 11, 2016

(51) Int. Cl.
G05G 1/10      (2006.01)
G05G 1/015     (2008.04)
G05G 1/01      (2008.04)
B60K 26/02     (2006.01)

(52) U.S. Cl.
CPC ............. *G05G 1/015* (2013.01); *B60K 26/02* (2013.01); *G05G 1/01* (2013.01); *G05G 1/10* (2013.01)

(58) Field of Classification Search
CPC . G05G 1/015; G05G 1/01; G05G 1/10; B60K 26/02
See application file for complete search history.

(56) References Cited

U.S. PATENT DOCUMENTS

| 1,824,843 | A | * | 9/1931 | Staley | B60D 1/04 280/504 |
| 2,292,091 | A |   | 8/1942 | Rhodes | |
| 2,497,328 | A | * | 2/1950 | Smith | E05B 55/005 292/169.18 |
| 3,199,368 | A |   | 8/1965 | Funk et al. | |
| 3,403,734 | A | * | 10/1968 | Herrmann | B64C 27/18 244/17.11 |
| 4,012,015 | A | * | 3/1977 | Nelson | B64D 31/04 244/220 |
| 4,054,083 | A | * | 10/1977 | Utter | E02F 9/2004 137/596.17 |
| 4,119,186 | A | * | 10/1978 | Choudhury | B63H 21/213 477/107 |
| 5,231,892 | A |   | 8/1993 | Haight | |
| 5,590,564 | A | * | 1/1997 | Kishimoto | B62K 23/04 74/108 |

(Continued)

FOREIGN PATENT DOCUMENTS

| EP | 1216876 A2 | 6/2002 |
| JP | 2010285970 A | 12/2010 |
| WO | 2013088261 A2 | 6/2013 |

OTHER PUBLICATIONS

Case IH, "Operators Manual—Controls and Instruments and Operating Instructions", pp. 3-17, 3-23, 3-24, 4-39 thru 4-41, 1st edition English, Mar. 2014 (7 pages).

*Primary Examiner* — Vicky Johnson

(57) ABSTRACT

An interface or throttle control assembly includes a housing and first and second wheel rotatably supported by the housing adjacent to each other. The assembly also includes a pair of tabs, each projecting from a corresponding one of the wheels. The tabs are engagable with each other. The assembly also includes a latch mechanism which mounted on one of the wheels. The latch mechanism is movable to a latched position engaging the other wheel so that the wheels rotate together, and is movable to an unlatched position so that the wheels can be rotated independently of each other.

11 Claims, 6 Drawing Sheets

(56) References Cited

U.S. PATENT DOCUMENTS

| | | | |
|---|---|---|---|
| 6,041,673 A | 3/2000 | Schmillen | |
| 6,065,448 A | 5/2000 | Hatton et al. | |
| 7,472,684 B1 | 1/2009 | McKee et al. | |
| 8,539,652 B2 * | 9/2013 | Richardson | F16B 21/073 24/603 |
| 2009/0143948 A1 | 6/2009 | Dahl et al. | |
| 2012/0297915 A1 * | 11/2012 | Pfromm | G05G 9/00 74/480 R |

* cited by examiner

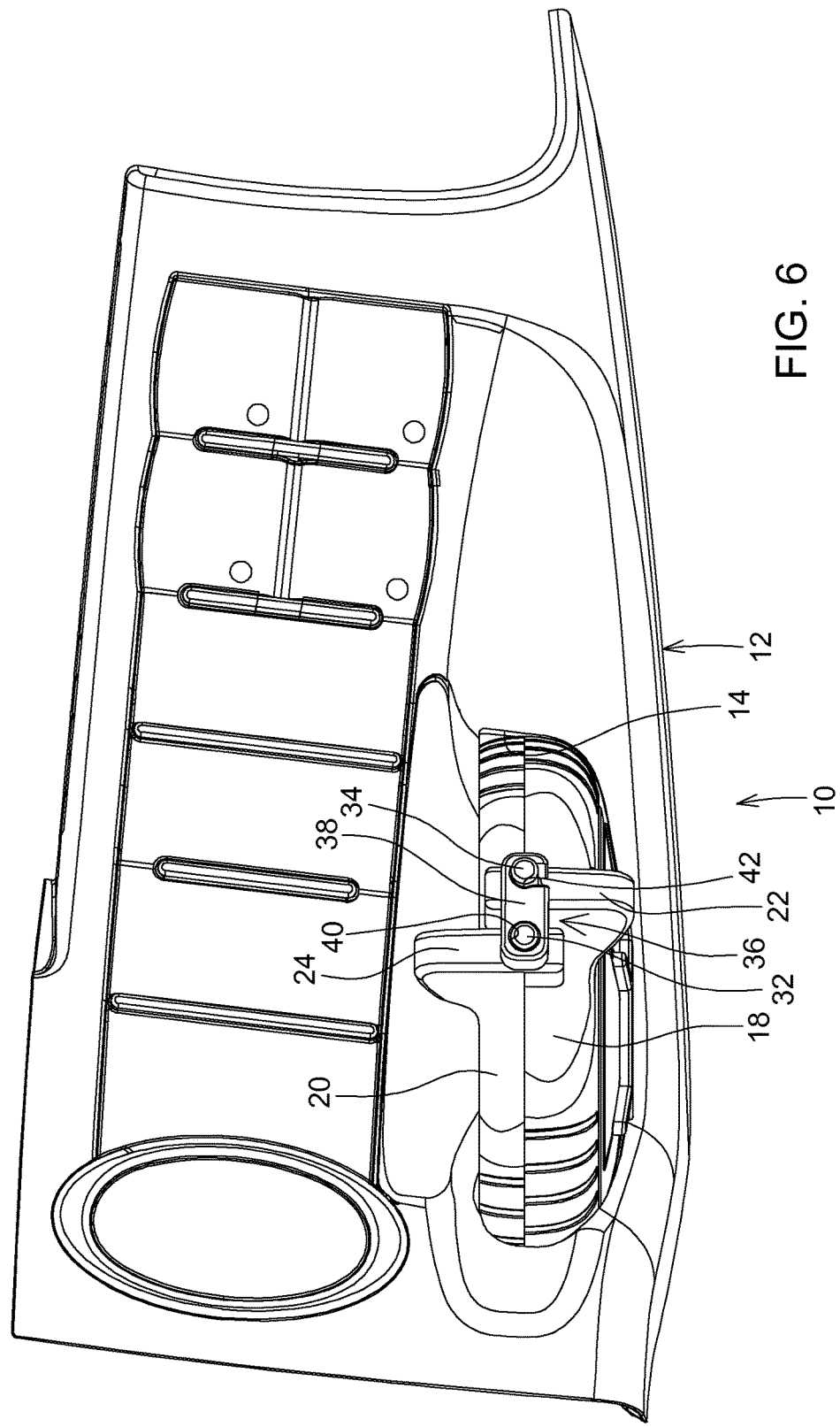

CONTROL INTERFACE ASSEMBLY

TECHNICAL FIELD

The present disclosure relates to a control interface assembly, such as a throttle control for a vehicle.

BACKGROUND

Interface mechanisms are used on vehicles to control various vehicle components or subsystems. Throttle controls are used to control vehicle engines. Dual lever throttle controls are commercially available wherein one throttle lever sets a desired minimum engine speed and a second lever sets a desired maximum engine speed. With such a dual lever throttle control, there can be a combination of positions whereby the operator cannot tell which control will govern engine commands from visual or physical position of the levers. For example, if the engine minimum lever is set above the engine maximum lever, it will not be clear to the operator what the engine speed will be. It is desired to provide a dual lever throttle control which avoids ambiguous control positions.

SUMMARY

According to an aspect of the present disclosure, an interface assembly includes a housing, a first member rotatably supported by the housing and a second member rotatably supported by the housing adjacent to the first member. The first member may comprise a wheel, and the second member may comprise a wheel. A first tab projects from and is fixed with respect to the first member. A second tab projects from and is fixed with respect to the second member. The second tab is engagable with the first tab to prevent the first member from moving past the second member in one direction. The first tab may overlap a portion of the second member, and the second tab may overlap a portion of the first member.

A latch mechanism is mounted on one of the members. The latch mechanism is movable to a latched position engaging the other member so that the members move together. The latch mechanism is also movable to an unlatched position so that the members can be moved independently of each other.

The latch mechanism includes a first pin projecting from the first member, a second pin projecting from the second member, and a bail pivotally mounted on the first pin. The bail is movable to releasably engage the second pin. The bail comprises a bar having a bore which rotatably receives the first pin and a slot which releasably receives the second pin.

BRIEF DESCRIPTION OF THE DRAWINGS

FIG. 6 is a top view of the control interface assembly of FIG. 1 in the latched configuration.

DETAILED DESCRIPTION OF THE DRAWINGS

At least one example embodiment of the subject matter of this disclosure is understood by referring to FIGS. 1 through 6 of the drawings.

Figure 1:
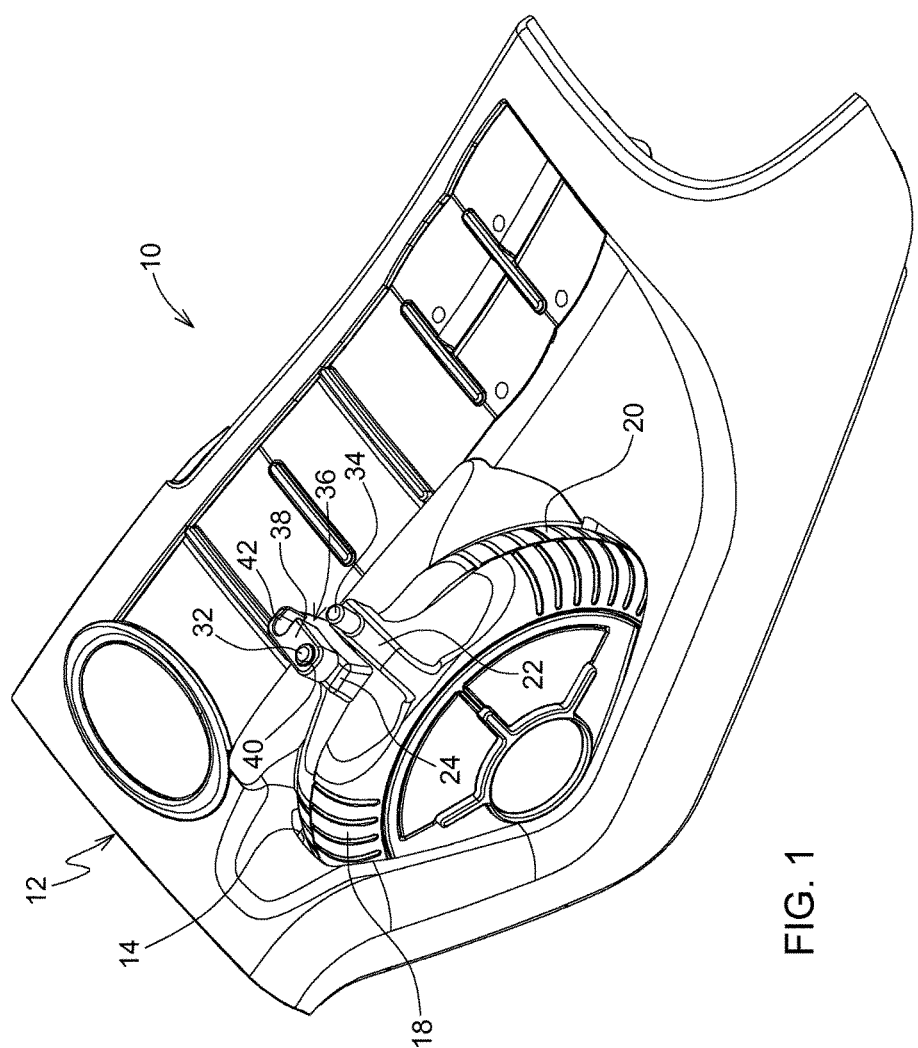
FIG. 1 is top perspective view of a control interface assembly embodying the invention in a first or unlatched configuration.
Figure 2:
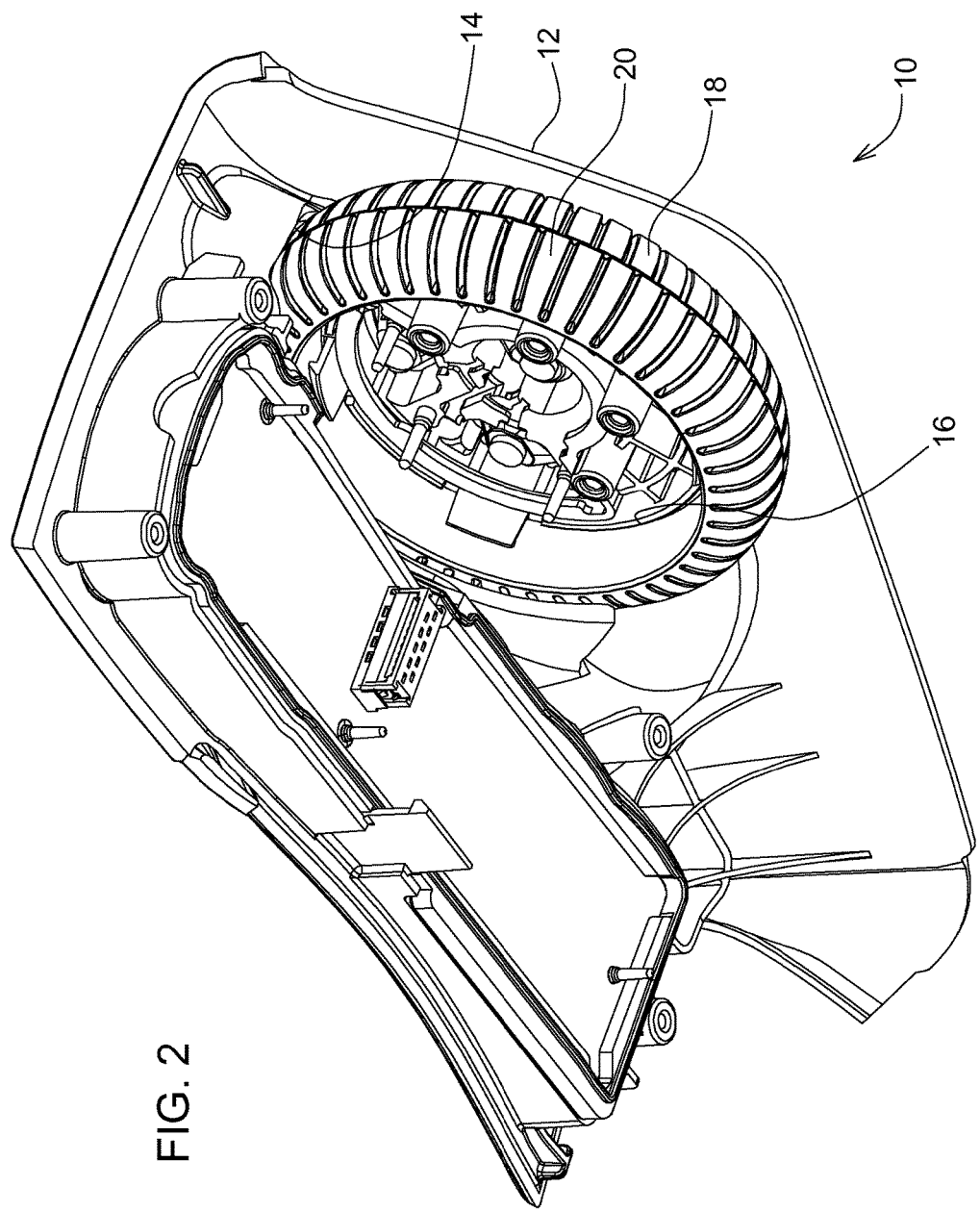
FIG. 2 is a bottom perspective view of the control interface assembly of FIG. 1.

Referring to FIGS. 1 and 2, an interface assembly 10 includes a housing 12 having an opening 14 formed therein. As best shown in FIG. 2, the housing includes a cylindrical hub 16. A first movable member or wheel 18 is rotatably supported by the hub 16. A second movable member or wheel 20 is also supported by the hub 16 and is adjacent to the first wheel 18. The wheels 18 and 20 project through the opening 14 so that only a portion of the wheels 18, 20 is visible or exposed in FIG. 1. Instead of wheels, pivoting levers or sliding members could be used instead.

A first tab 22 is fixed with respect to the first wheel, projects radially and axially from the first wheel 18. The tab 22 is engagable with the second member 20 to prevent the first member 18 from moving past the second member 20 in a first direction. The first tab 22 may overlap a portion of an outer surface of the second wheel 20. A second tab 24 is fixed with respect to the second wheel, projects radially and axially from the second wheel 20, and may overlap a portion of an outer surface of the first wheel 18. As best seen in FIG. 1, the tabs 22 and 24 are engagable with each other. Viewing FIG. 1, this engagement prevents the first wheel 18 from rotating counterclockwise past the second wheel 20, and prevents the second wheel 20 from rotating clockwise past the first wheel 18.

The interface assembly 10 also includes a latch mechanism 30 which mounted on one of the wheels. The latch mechanism 30 is operable releasably latch the wheels 18 and 20 together so that the wheels 18 and 20 rotate together. The latch mechanism 30 is also operable to unlatch the wheels 18 and 20 from each other so that the wheels 18 and 20 can be rotated independently of each other.

The latch mechanism 30 includes a first pin 32 which projects radially from the second tab 24, a second pin 34 which projects radially from the first tab 22, and a bail 36 pivotally mounted on the first pin 32. The bail 36 comprises a bar 38 having a bore 40 which rotatably receives the first pin 32 and a slot 42 which releasably receives the second pin 34. The bail 36 is pivotal on the first pin 32 so that the slot 42 releasably receives the second pin 34.

Figure 3:
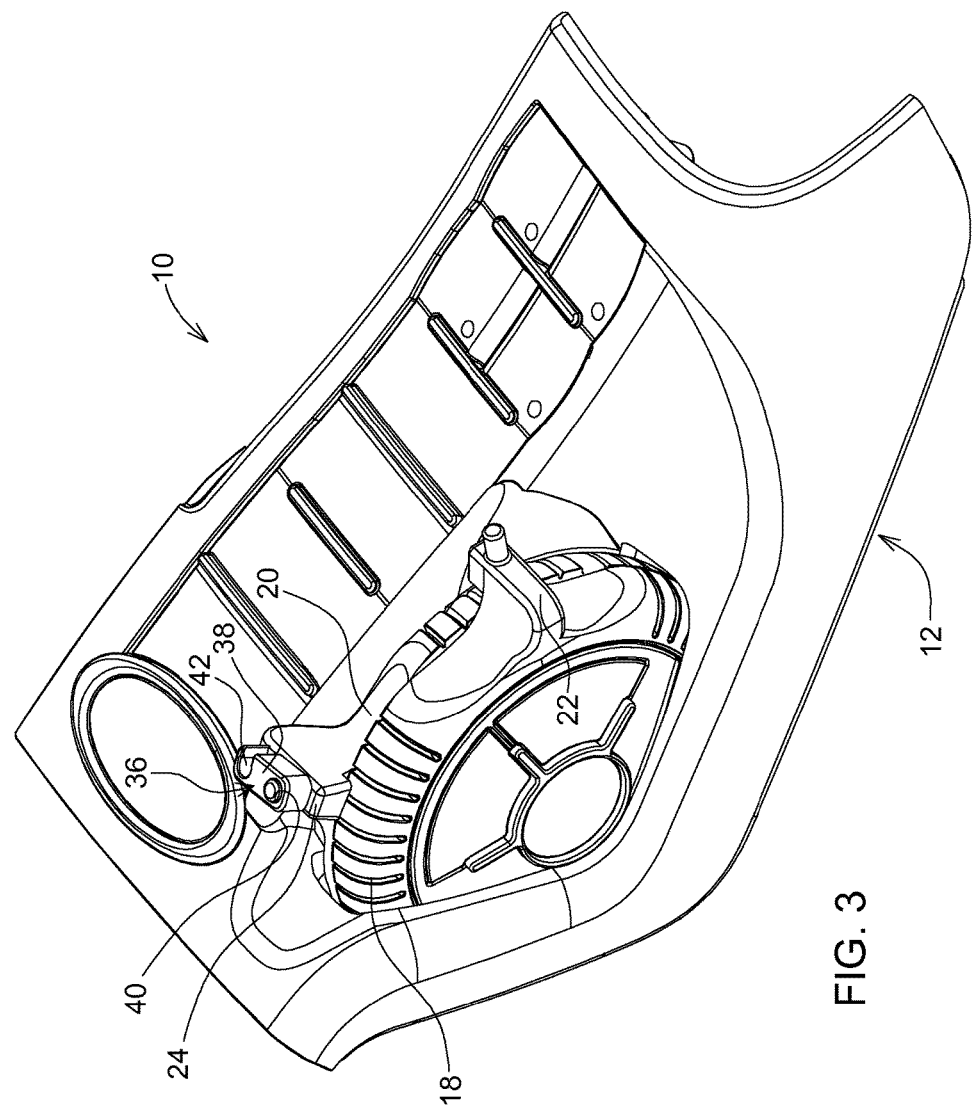
FIG. 3 is a top perspective view of the control interface assembly of FIG. 1 in a second configuration.
Figure 4:
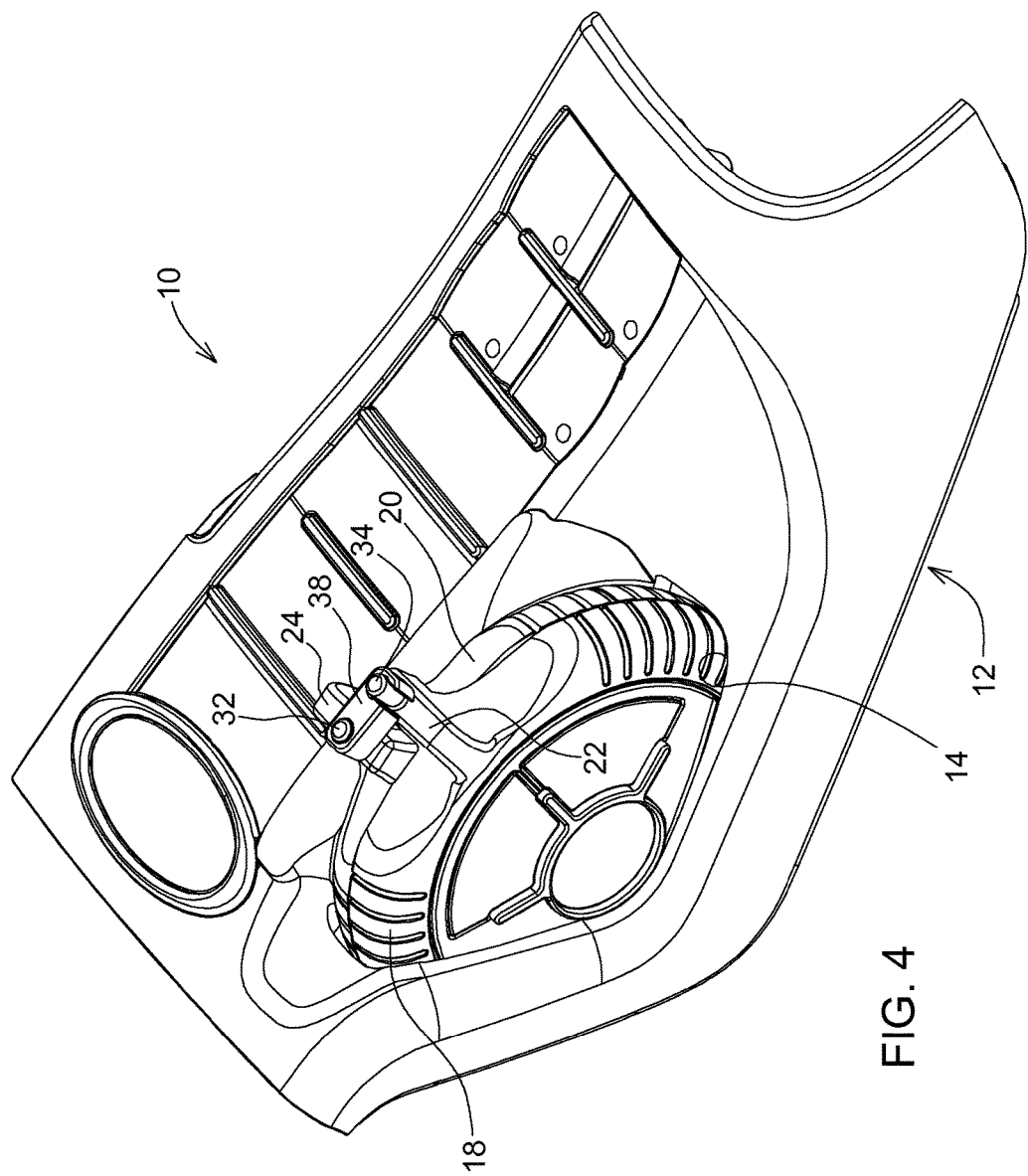
FIG. 4 is a top perspective view of the control interface assembly of FIG. 1 in a latched configuration.
Figure 5:
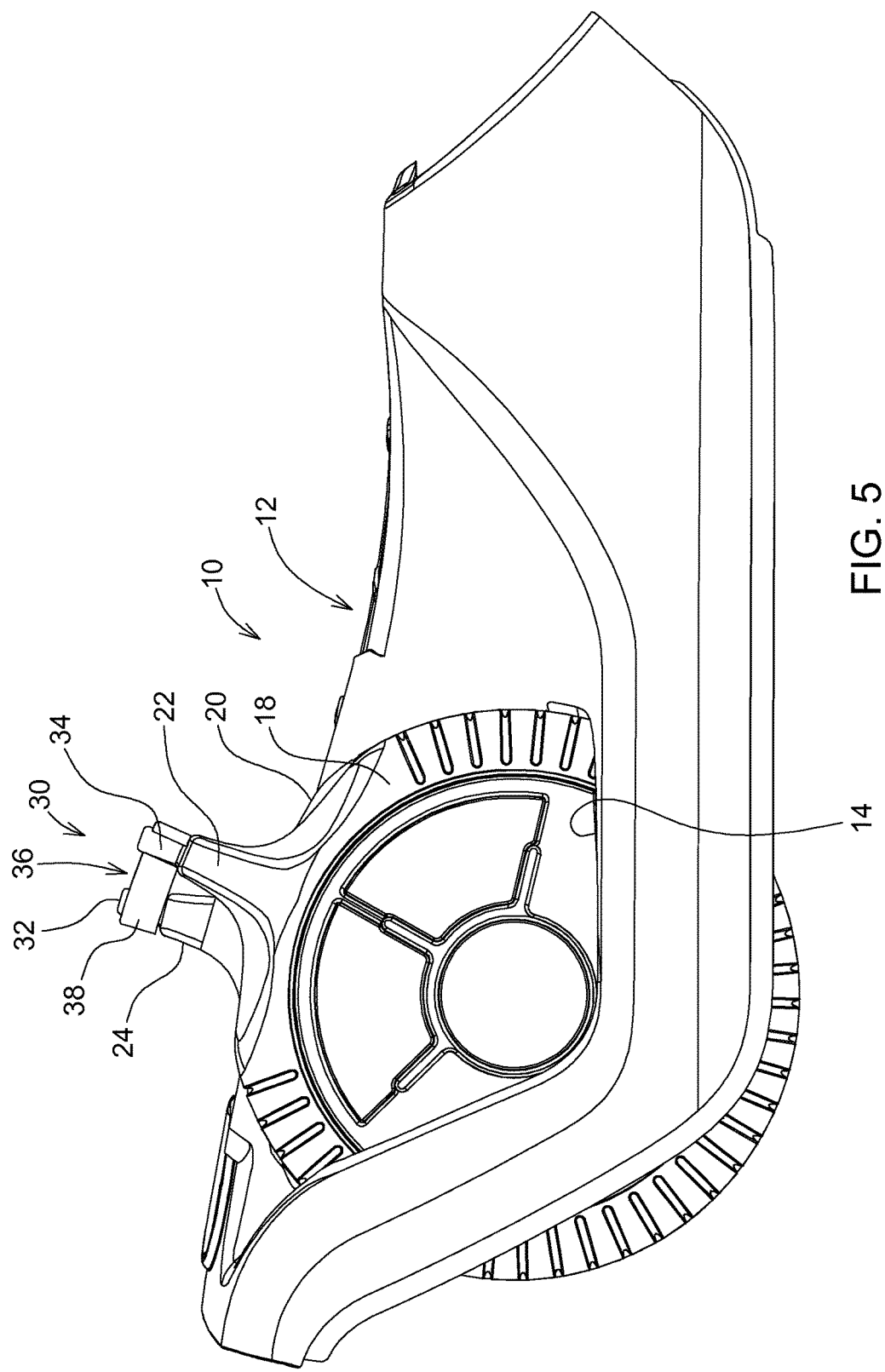
FIG. 5 is a side view of the control interface assembly of FIG. 1 in the latched configuration.

Referring to FIG. 3, when the latch mechanism 30 is unlatched, the wheels 18 and 20 can be moved independently and the tabs 22 and 24 can be spaced apart from each other. Referring to FIGS. 4-6, when the latch mechanism 30 is latched, the wheels 18 and 20 can only be moved together and the tabs 22 and 24 are locked together by the bail 36.

With the design, ambiguity is averted by mechanical means where one control member engages and moves the other control member so that minima and maxima can be set without causing confusion. Also, the controls can be locked together so that either lever can be moved to achieve the functionality of a single lever. Thus, this assembly can be operated as a dual lever control, or it can be converted to operate as a single lever control.

Transducers (not shown) are coupled to the first and second wheels 18, 20 so that signals can be generated representing the position of the wheels 18, 20. The interface assembly 10 can then be used as a dual lever throttle control, where the wheels 18 and 20 operate as throttle levers, whereby one lever controls the engine minimum speed and the other the engine maximum speed.

While the above describes example embodiments of the present disclosure, these descriptions should not be viewed in a limiting sense. Rather, there are several variations and modifications which may be made without departing from the scope of the present invention as defined in the appended claims.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. An interface assembly comprising:
a housing;
a first member rotatably supported, about an axis, by the housing;
a second member rotatably supported, about the axis, by the housing, the second member being adjacent to the first member;
a first tab projecting from and fixed with respect to the first member;
a second tab projecting from and fixed with respect to the second member, the second tab being engagable with the first tab; and
a latch mechanism mounted on one of the members, the latch mechanism configurable to be in a latched position engaging the other member so that the members move together, and the latch mechanism configurable to be in an unlatched position so that the members move independently of each other, the latch mechanism comprising:
a first pin projecting from the first member;
a second pin projecting from the second member; and
a bail pivotally mounted on the first pin, the bail being movable to releasably engage the second pin.

2. The interface assembly of claim 1, wherein:
the bail comprises a bar having a bore which rotatably receives the first pin and a slot which releasably receives the second pin.

3. The interface assembly of claim 1, wherein:
the first pin projects radially from the first member; and
the second pin projects radially from the second member.

4. The interface assembly of claim 1, wherein:
the first member comprises a wheel; and
the second member comprises a wheel.

5. The interface assembly of claim 1, wherein:
the first tab overlaps a portion of the second member; and
the second tab overlaps a portion of the first member.

6. The interface assembly of claim 1, wherein:
the first and second members are rotatably supported by the housing.

7. The interface assembly of claim 6, wherein:
the first tab projects radially and axially from the first member; and
the second tab projects radially and axially from the second member.

8. An interface assembly comprising:
a housing;
a first wheel rotatably supported by the housing;
a second wheel supported by the housing adjacent to the first wheel;
a first tab projecting radially and axially from the first wheel, the first tab overlapping a portion of an outer surface of the second wheel and being fixed with respect to the first wheel;
a second tab projecting radially and axially from the second wheel, the second tab overlapping a portion of an outer surface of the first wheel, the second tab being engagable with the first tab and being fixed with respect to the second wheel; and
a latch mechanism mounted on one of the wheels, the latch mechanism configurable to be in a latched position engaging the other wheel so that the wheels rotate together, and the latch mechanism configurable to be in an unlatched position so that the wheels rotate independently of each other, the latch mechanism comprising:
a first pin projecting from the first wheel;
a second pin projecting from the second wheel; and
a bail pivotally mounted on the first pin, the bail being movable to releasably engage the second pin.

9. The interface assembly of claim 8, wherein:
the bail comprises a bar having a bore which rotatably receives the first pin and a slot which releasably receives the second pin.

10. The interface assembly of claim 8, wherein:
the first pin projects radially from the first wheel; and
the second pin projects radially from the second wheel.

11. The interface assembly of claim 10, wherein:
the bail comprises a bar having a bore which rotatably receives the first pin and a slot which releasably receives the second pin.

* * * * *